Figure 1:
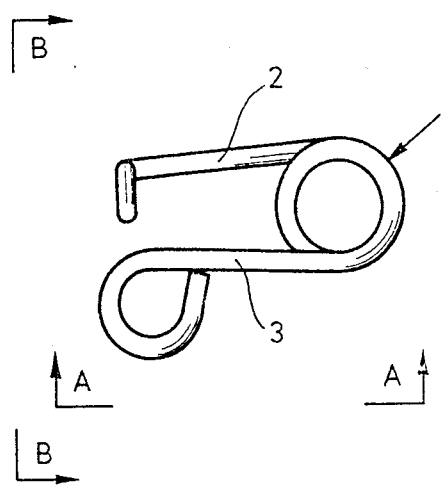

United States Patent [19]

Platten

[11] Patent Number: 4,792,254

[45] Date of Patent: Dec. 20, 1988

[54] ELECTRIC FENCE CLIP

[75] Inventor: Conrad M. Platten, Gisbourne, New Zealand

[73] Assignee: Wrightson NMA Limited, Gisbourne, New Zealand

[21] Appl. No.: 59,744

[22] Filed: Jun. 8, 1987

[30] Foreign Application Priority Data

Jul. 28, 1986 [NZ] New Zealand .................. 216999

[51] Int. Cl.⁴ ............................................. F16B 7/06
[52] U.S. Cl. ...................................... 403/48; 256/10;
47/46; 174/158 F
[58] Field of Search ................ 256/10, 47, 48; 47/46;
24/551; 174/158 F, 161 F, 163 F, 170

[56] References Cited

U.S. PATENT DOCUMENTS 700,208  5/1902  Lafo et al. ........................... 24/551
2,484,449 10/1949  Fetterman ....................... 24/551 X

FOREIGN PATENT DOCUMENTS 614993 12/1979  Switzerland ......................... 256/10

Primary Examiner—Andrew V. Kundrat
Attorney, Agent, or Firm—Robert B. Murray

[57] ABSTRACT

Unitary fence clip formed from a resilient wire having a fence standard or post engaging coil region and two arms extending therefrom. One of the arms from one end of the coil region includes at least a partly formed loop and the other of the arms from the other end of the coil includes a member engageable in the at least partly formed loop. The member engageable in the partly formed loop when so engaged defines a closed zone between the arms and the coil through which a fence wire or the like can be located.

6 Claims, 1 Drawing Sheet

ELECTRIC FENCE CLIP

The present invention relates to improvements in and/or relating to clips for attachment to an upstanding fence standard to enable the location of a wire in relation to the post but in a free sliding manner.

Many forms of electric or other types of fencing are known where upstanding circular sectioned rods are utilised to which a horizontal wire or the equivalent is to be attached and preferably in a slidable relationship. It is to such application that the present invention is primarily directed.

Accordingly in one aspect the present invention consists in a unitary fence clip formed from a resilient wire having a fence standard or post engaging coil region and two arms extending therefrom, one of said arms from one end of the coil region including at least a partly formed loop and the other of said arms from the other end of the coil including a member engageable in said at least partly formed loop, said means engageable in said partly formed loop defining when so engaged a closed zone between said arms and said coil through a fence wire or the like can be located.

The arm members are disposed so that when being preferably brought into engagement they increase the grip of said coil on said post or standard.

Preferably said at least partly formed loop is a complete loop.

Preferably said central coil includes three complete loops.

Preferably said arm members can be splayed apart to release or at least ease the grip of said central coil on a fence post in the form of a rod.

In a further aspect the present invention consists in a method of locating a fence wire which utilises a fence clip in accordance with the present invention in a manner substantially as hereinafter described.

In yet a further aspect the present invention consists in, combination, at least one fence clip in accordance with the present invention and a fence standard on which the central coil region of the clip has been located.

Preferably said combination also includes a wire located in the closed zone between said arms and said central coil.

Figure 2:
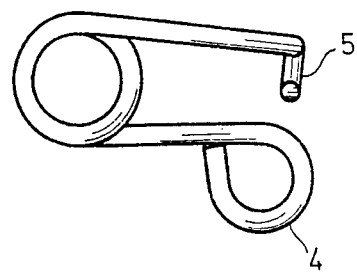
Figure 3:
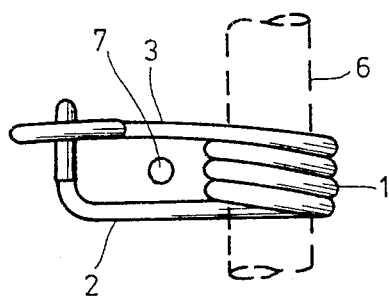
Figure 4:
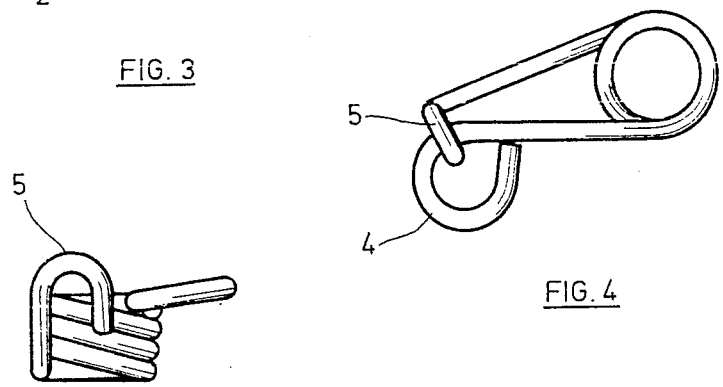
Figure 5:
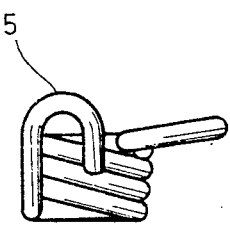

One preferred form of the present invention will now be described with reference to the accompanying drawing in which FIG. 1 is a plan view of a fence clip in a preferred form shown in an open condition which will allow the easy sliding of the central coil down onto a fence rod, e.g. fibreglass rod (not shown), FIG. 2 is the opposite side view of the clip of FIG. 1, FIG. 3 shows a fence clip as shown in FIG. 1 from the direction AA and showing how the same can have a wire inserted in between the arms at the zone thereof to be closed and showing in broken outline a fence rod positioned through the central coil, FIG. 4 is a similar view to that of FIG. 1 but showing the arms in their closed condition with the end of one arm engaging in the loop at the end of the other and, FIG. 5 is a view BB of the open clip as shown in FIG. 1.

In the preferred form of the present invention a length of wire of appropriate resilience is formed into the configuration as shown. It includes a central coil region 1 and two arms 2 and 3 respectively. Arm 3 includes at the end thereof a loop, preferably a complete loop or series of loops 4, while the other includes means 5 (best seen in FIG. 5) which is engageable in the manner shown in FIG. 4 within the loop 4.

In use therefore the clip in a condition as shown in FIG. 1 would have a fence rod 6 slid through the central coil region 1 and this can be made easier by splaying the arms further apart than shown.

A wire 7 can then be located between the arms 2 and 3 since the arms 2 and 3 are at opposite ends of the central coil region 1 and then the means 5 and 4 interengaged to hold the wire 7 in a sliding inter-relationship with the post 6.

A person skilled in the art will appreciate how a fence clip in accordance with the present invention provides a workable alternative to previously existing types of fence clip.

What is claimed is:

1. A unitary fence clip formed from a resilient wire, said clip comprising:
   a fence standard or post engaging substantially helical coil region having a helical axis, said coil region having at least one complete loop;
   a first arm extending from one end of said coil region;
   a second arm extending from the other end of said coil region, said first and second arms being substantially normal to a plane which includes said helical axis;
   said first arm including as a distal region at least a partly formed loop and said second arm including an end region engageable in said at least partly formed loop to bring said first and second arms into engagement with each other, said first and second arms requiring both squeezing together against the resilience of said coil region and prying apart in a direction parallel to said helical axis to enable entry of said first and second arms into said engagement with each other and retention of said engagement owing to a bias thus created in two directions;
   said first and second arms in said engagement defining a closed zone between said arm and said coil region through which a fence wire or the like is locatable;
   said squeezing together of said arms tending to tighten at least part of said coil region so as to enhance grip on a fence standard or post received through said coil region, pulling apart of said arms opposite to said squeezing tending to reduce said grip to allow for fitting of said coil region on a fence standard or post of appropriate cross-sectional dimension.

2. A fence clip as claimed in claim 1, wherein said at least partly formed loop is a complete loop.

3. A fence clip as claimed in claim 1, wherein said central coil includes at least two complete loops.

4. A fence clip as claimed in claim 3, wherein said central coil includes three complete loops.

5. In combination at least one unitary fence clip formed from a resilient wire and comprising:
   a fence standard or post engaging substantially helical coil region having a helical axis, said coil region having at least one complete loop;
   a first arm extending from one end of said coil region;
   a second arm extending from the other end of said coil region, said first and second arms being substantially normal to a plane which includes said helical axis;

said first arm including as a distal region at least a partly formed loop and sdaid second arm including an end region engageable in said least partly formed loop to bring said first and second arms into engagement with each other, said first and second arms requiring both squeezing together against the resilience of said coil region and prying apart in a direction parallel to helical axis to enable entry of said first and second arms into said engagement with each other and retention of said engagement owing to a bias thus created in two directions;

said first and second arms when in said engagement defining a closed zone between said arm and said coil region through which a fence wire or the like is locatable;

said squeezing together of said arms tending to tighten at least part of said coil region so as to enhance grip on a fence standard or post received through said coil region, pulling apart of said arms opposite to said squeezing tending to reduce said grip to allow for fitting of said coil region on a fence standard or post of appropriate cross-sectional dimension; and a fence standard on which said coil region of said clip has been located.

6. A combination as claimed in claim 5, wherein said combination also includes a wire located in said closed zone between said first and second arms and said helical coil.

* * * * *